US005352314A

United States Patent [19]

Coplan

[11] Patent Number: 5,352,314

[45] Date of Patent: Oct. 4, 1994

[54] GRAPHICS TRANSFER APPLICATOR

[76] Inventor: Jay E. Coplan, 2614 Jacaranda Ave., Carlsbad, Calif. 92009

[21] Appl. No.: 16,151

[22] Filed: Feb. 5, 1993

[51] Int. Cl.[5] .......................... B44C 1/16; B44C 3/00; B32B 1/00

[52] U.S. Cl. .................................... 156;234; 156/235; 156/240; 156/247

[58] Field of Search ............... 156/236, 235, 239, 240, 156/241, 247, 248, 229, 230, 234; 427/149

[56] References Cited

U.S. PATENT DOCUMENTS

| | | | |
|---|---|---|---|
| 2,020,717 | 11/1935 | Ansell | 156/240 |
| 3,013,917 | 12/1961 | Karlan | 156/240 X |
| 3,055,787 | 8/1957 | MacKenzie | 156/240 X |
| 3,287,192 | 11/1966 | Pohlenz | 156/240 X |
| 3,376,182 | 4/1968 | Borell | 156/235 X |
| 3,485,696 | 12/1969 | Hammonds | 156/235 X |
| 3,835,773 | 9/1974 | Vasilantone | 156/229 X |
| 3,897,587 | 7/1975 | Molner | 156/235 X |
| 3,898,357 | 8/1975 | Miller | 156/240 X |
| 4,041,204 | 8/1977 | Hepher et al. | 156/204 X |
| 4,197,151 | 4/1980 | Muzik | 156/235 X |
| 4,328,051 | 5/1982 | Robinette | 156/229 X |
| 4,400,419 | 8/1983 | Laczynski | 156/249 X |
| 4,544,430 | 10/1985 | Shepherd | 156/241 X |
| 4,692,198 | 9/1987 | Borreson | 156/235 |
| 4,919,994 | 4/1990 | Incremonia | 156/240 X |
| 5,147,489 | 9/1992 | Scrutton | 156/240 X |

*Primary Examiner*—David A. Simmons
*Assistant Examiner*—Charles Rainwater
*Attorney, Agent, or Firm*—Baker, Maxham, Jester & Meador

[57] ABSTRACT

An open rectangular frame covered on one side with a flexible, transparent film having releasable adhesive on the side toward the frame is laid over weeded graphic art. The film is held in place on the frame with elongated clips which slip over the four sides of the frame to capture the film. The film is then pressed down onto the graphics, lifted off of the underlying surface carrying the weeded graphics with it, and the release paper is then peeled from the graphics, leaving the graphics bonded onto the film with the exposed graphics adhesive on the side of the graphics opposite the film side. The frame is then positioned by observing through the transparent film to properly line up the graphics with the underlying display, and the film is pressed down, pressing the graphics into engagement with the underlying display panel subsequent to which the frame is removed, leaving perfectly positioned graphics in their final resting place on the display panel.

2 Claims, 1 Drawing Sheet

Fig. 1
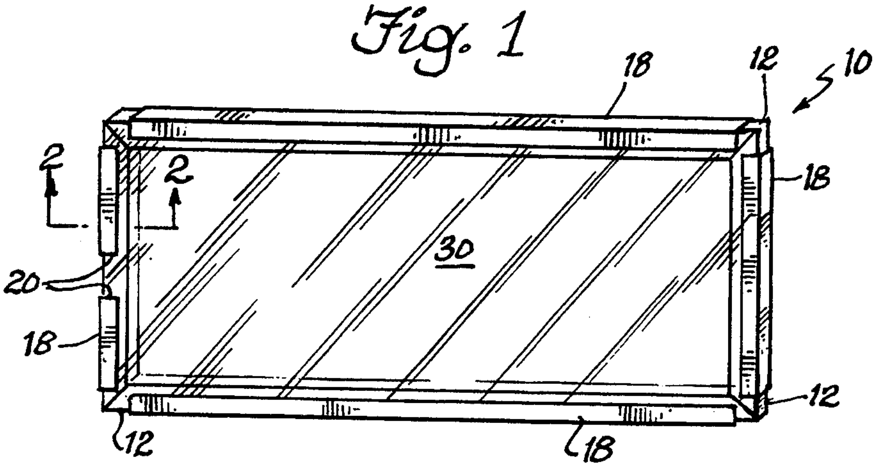
Fig. 2
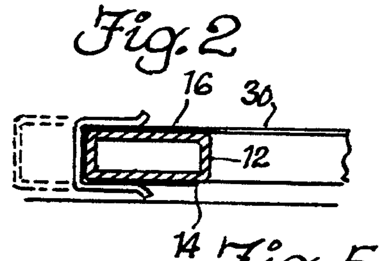
Fig. 3
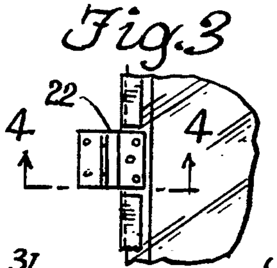
Fig. 4
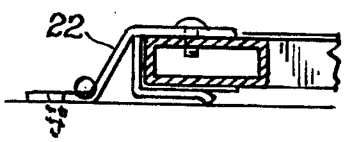
Fig. 5
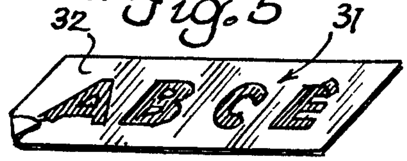
Fig. 6
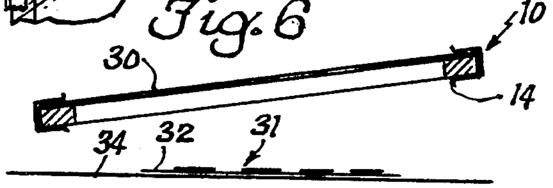
Fig. 7
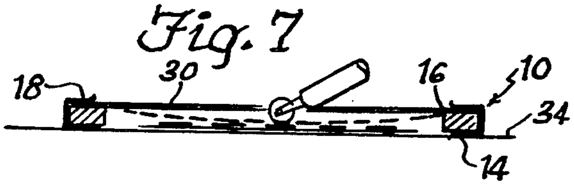
Fig. 8
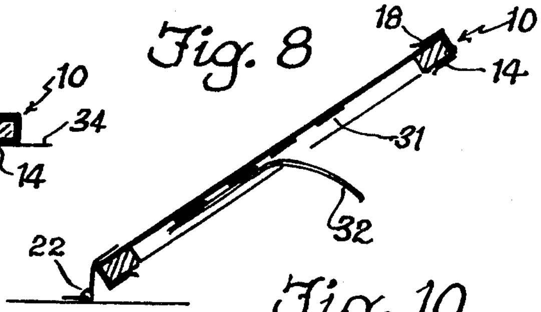
Fig. 9
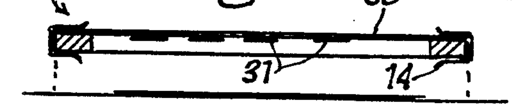
Fig. 10
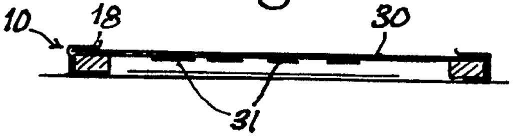
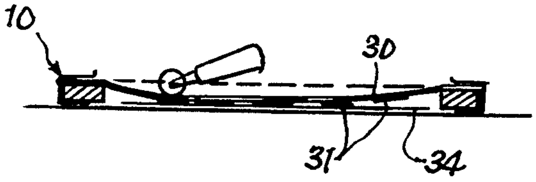
Fig. 11
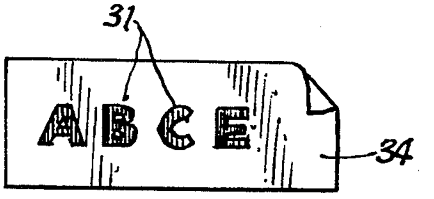
Fig. 12

GRAPHICS TRANSFER APPLICATOR

BACKGROUND OF THE INVENTION

Signs and other graphics displays which used to be universally painted by sign artists and the like are now increasingly created from graphics composed on a computer which outputs through a plotter which drives a stylus. The stylus cuts through a thin colored sheet of vinyl or similar material down to the release paper bonded to the back of the vinyl, and stops short of cutting through the release paper. The result is an outlined graphic image or images in the vinyl sheet which appears when the surrounding areas of the sheet are peeled away, leaving the "weeded" graphics in isolation on the release paper.

In order to get the graphics from weeded form to the final display panel such as a sign backing, traditionally a strip or strips of transfer tape are cut to the appropriate length and pressed onto the upper face of the graphics to hold them in their proper orientation. The transfer tape bonds to the graphics stronger than the graphics bond to the underlying release paper, so that when it is peeled back the graphics stick with the transfer tape.

The transfer tape with the adhered graphics is then positioned on the display panel, and when properly aligned, pressed down to bond the sticky underside of the graphics, which previously had adhered to the release paper, to the face of the display panel. The transfer tape is then peeled off, leaving the graphics in their final place on the display panel.

Transfer of the graphics with transfer tape is a very established practice. It is for all practical purposes the only way weeded graphics are transferred to the sign board or other display. That does not mean, however, that this technique is without its disadvantages.

For example, the opaque release paper covers the entire area of the graphics and beyond, making it difficult to properly position the graphics on the underlying panel if the positioning must be precise due to its alignment with other graphics. When tiling or laying down a second color, pinpoint accuracy is required, but precision registry is impeded because no direct visual registry can be made because of the opaque release paper. Because of the stickiness of the graphics, the release paper cannot be removed until the graphics are preliminarily positioned and the transfer tape marked with lines that cross from the tape to the panel. When the release paper is removed, re-alignment of the alignment lines on the transfer tape with the panel fairly accurately positions the graphics, but it would be simpler to align the graphics if direct visual registry could be made on the initial alignment by looking straight through the periphery of the graphics to the underlying display panel.

Another disadvantage of the transfer tape technique lies in the fact that the transfer tape is cut into the appropriate lengths for specific graphics and is discarded after each use. Currently the tape coasts ten cents per foot, and a busy sign shop, such as that of applicant, may go through $20-$$40 worth of transfer tape a day. The sheer volume of used tape creates a disposal nuisance.

Since the graphics are floppy, as they need to be to go through the plotter, they must be stretched tight when lining up the graphics to the alignment marks. This means either cutting the graphics into two-foot lengths so that one person can handle it, or having two people do the job with the encumbent added labor expense.

There is a need for a graphics transfer applicator which permits direct graphics registry on the display panel and eliminates the waste and cost of disposing of transfer tape after every transfer, and enables a single person to transfer graphics of an indefinite length.

SUMMARY OF THE INVENTION

The invention fulfills the above stated need by effecting the transfer operation using an open rectangular frame which has a transparent film sheet stretched semitautly against one side of the frame side member, spanning the central area defined interiorly of the frame. The film can be fixed to the frame with side clips or some other suitable means. The transparent film has a releasable adhesive on the side toward the frame sidebars. The tautness of the film is coordinated with the thickness of the frame sidebars such that when the frame is laid on a flat surface with the film side up, the film remains spaced from the underlying surface without touching it but will touch when pressed down.

The frame is laid in this fashion over weeded graphics, with the film pressed down onto the graphics to bond to the upper surface of the graphics (or the weeded graphics can be applied to the transfer film). When the frame is removed, carrying the weeded graphics on the film underside, the release paper is then peeled off so that only the graphics remain on the transparent film, not covered by an opaque layer.

The frame is then moved to the final display panel, where it can be moved around freely over the display until the graphics are exactly positioned. This can be accomplished easily by direct registry of the graphics with the underlying display simply by looking through the film.

Once the graphics are positioned, the film is pressed down onto the underlying display panel. The graphics themselves have adhesive on the side which is now opposite the film side, and this adhesive is stronger in its attachment to the display panel than is the bond between the graphics and the film, so when the frame is lifted, the graphics remain in place on the display panel.

Tiling and second color overlays can be transferred quickly and accuracy by visual direct registry. The applicator can be used many times, on the order of 20 times before the film must be replaced, reducing the cost of transfer materials to about one cent per square foot of transferred graphics. Trash volume is reduced to 5% of discarded transfer tape volume for an equivalent amount of work. One person can now transfer an eight-foot length of graphics, eliminating the need to either cut it into two-foot lengths or find a helper.

BRIEF DESCRIPTION OF THE DRAWINGS

FIG. 1 is a perspective view of the rear side of the applicator;

FIG. 2 is a section taken along line 2—2 of FIG. 1;

FIG. 3 is a fragmentary plan view of a modification of the invention in which a the frame is hinged to an underlying surface;

FIG. 4 is a sectional detail of the modification of FIG. 3 taken along line 4—4 of FIG. 3;

FIG. 5 illustrates a typical configuration of weeded vinyl graphics which comprise alphabet letters;

FIG. 6 illustrates the positioning of the frame over the weeded graphics;

FIG. 7 illustrates the rolling of the back side of the film down onto the weeded graphics to bond the film to the graphics surface;

FIG. 8 illustrates the removal of the frame from the underlying surface to peel the release paper from the backside of the graphics, with the frame being shown as the hinged embodiment;

FIG. 9 illustrates the lowering of the frame over a sign blank or display panel;

FIG. 10 illustrates the frame resting on the underlying surface so that it can be moved around freely in the horizontal plane to position the graphics properly;

FIG. 11 illustrates the application of a roller against the back side of the film to press the underlying graphics onto the display panel; and, FIG. 12 illustrates the final product, with the graphics being attached to the underlying display panel in exactly the same configuration as they appeared when attached to the release paper of FIG. 5.

DETAILED DESCRIPTION OF THE PREFERRED EMBODIMENT

As shown in FIG. 1, the invention is based on an open frame 10 which is shown as being rectangular, and ordinarily would be rectangular, although other shapes are conceivable within the scope of the claims. Several differently sized frames would ordinarily be used in a sign shop, with the height of the frame, taken from the orientation of FIG. 1, being controlled by the width of the plotter which cuts the graphics from the graphics paper. For a 20" wide graphics strip, a 28" high frame would be used in order to be able to see the other elements of the display panel such as its edges and corners and previously applied graphics. The width of the frame would vary, for example in 2 foot increments from 2,'to 8' feet to accommodate long banner-like graphics. Graphics longer than the widest frame would be transferred in segments using appropriately sized frames.

The rectangular frame that is illustrated has four sidebars 12 which in the simplest form could be wood, but are preferably extruded aluminum as illustrated in FIGS. 2 & 4. Any conventional joining techniques could be used to join adjacent bars.

The frame could be as simple as that just described, with nothing more than four sidebars defining a rectangle. One face of the frame forms a plane-defining face 14, with the other side defining a film-mounting face 16. The film can be pulled across the film-mounting face 16 and stapled or tacked into place. Double-sticky tape could be used instead of staples or tacks. These represent simple forms of the invention which will work, although being less than optimally as film tension adjustability once the film is engaged on the frame is lacking.

To overcome this limitation of the simplest embodiments, the preferred and illustrated form of film attachment uses mounting clips 18 which are defined in the claims as part of the frame itself, which together with the film makes up the applicator.

The clips are elongated resilient channels which could be aluminum, very light steel or plastic. They are dimensioned to slip onto the sidebars with light pressure. One of the clips can be split as indicated at 20 to permit the attachment of a hinge 22.

The film sheet 30 is attached to the frame by laying it over the frame with the clips removed, with the side of the film which is coated with releasable adhesive toward the frame sidebars. This is done with the clamp bars removed. The clips are then slipped over the film and the sidebars, capturing the film against the face 16 of the frame. The film can be stretched or loosened or otherwise adjusted to remove wrinkles and creases and each side can be independently adjusted. This is very advantageous in that the film must be taut enough to be spaced from an underlying surface over which the frame is placed so that it does not touch the underlying surface at any point. This permits the frame to be horizontally adjusted relative to the underlying surface while carrying graphics sticky-side-down. Once this degree of film tautness is established, the applicator is ready to transfer graphics from their weeded form on release paper, to the film, then unweeded and applied to the sign blank or display panel.

FIG. 5 illustrates a typical weeded graphics display 31 of the letters "A, B, C and E". These letters have been cut on a plotter, with the stylus only cutting through the colorful vinyl layer and not through the release paper 32. The adjacent vinyl has been peeled off, leaving the graphics in weeded form, adhered to the underlying release paper.

The weeded graphics 31 are placed on a flat preferably horizontal surface 34, and the applicator is positioned over the graphics 31 as shown in FIG. 6. Laid flat on the underlying surface, the frame supports the film spaced slightly above the top side of the graphics. To bring the film into adhering contact with the graphics, it is pressed or rolled down against them as shown in FIG. 7.

The applicator is then lifted, carrying the weeded graphics 31 with it as shown in FIG. 8. The release paper 32 is then pulled from the graphics, which is now bonded to the sticky underside of the film as shown in FIG. 9.

Because the film is transparent, when the applicator is positioned over a sign blank or other display panel as illustrated in FIGS. 9 and 10, alignment of the graphics 31 with the panel 34 is very simply done by registering the graphics with whatever graphics or structure they must align with on the display panel. This can be done very quickly and very accurately compared to the prior art technique in which a two-step process of first making index marks across the transfer tape and the underlying panel, and then removing the weeded graphics to peel off the release paper and re-aligning the two pencil marks on the display before pressing the letters onto the panel and peeling off and discarding the transfer tape.

Once properly aligned, a roller or burnishing tool again is applied against the back surface of the film as shown in FIG. 11, identically as in FIG. 7. The adhesive strength of the three different surface-to-surface adhesive interfaces encountered in this process are controlled so that the two releases, and the final bonding, contemplated by the process execute properly.

The final work, illustrated in FIG. 12 comprises the unweeded graphics 36 in their final position on the display panel 34 as shown in FIG. 12.

The same frames can be used innumerable times before the sheet of film must be replaced. A great many transfers may be made before the coating finally loses too much tackiness to be usable. This represents a great savings over the one-use-only transfer tape.

FIGS. 3, 4 & 8 show an alternative embodiment in which the frame is hinged at 38 to the surface of an underlying platform such as a tabletop. This would be convenient for using a large frame. The underlying surface could also be defined by a rigid sheet so that the frame and sheet comprised a portable unit. Other variations are possible within the scope of the appended claims. No doubt film sheet attaching techniques other than those disclosed herein could be used. However, those mentioned above are effective, simple and inexpensive to create.

Applicant has used these applicators with great success, and anticipates that they will replace the transfer tape technique in a great many applications and in a great many shops, at the savings of an enormous amount of transfer tape.

It is hereby claimed:

1. A method of transferring weeded graphics to a display panel by using an open frame having a plane-defining face and a film-mounting face spaced from and being substantially parallel to said plane-defining face and substantially covered on said film-mounting face with a sheet of transparent, flexible film having releasable adhesive on the side thereof toward said plane-defining face, said frame defining an open area large enough to encompass said graphics and said film being flexible enough to be pressed through said film substantially into alignment with a plane defined by said plane-defining surface, said method comprising:

(a) placing said weeded graphics on a substantially flat surface with the release paper down;

(b) placing said frame plane-defining surface down over said graphics onto said substantially flat surface;

(c) pressing said film down into adhesive-bonding engagement with said graphics;

(d) peeling said release paper from said graphics, leaving the graphics adhered to said film;

(e) positioning said frame over said display panel and visually properly aligning said graphics with respect to said panel by observing said graphics and panel through said film;

(f) pressing said film, carrying said graphics on the underside thereof, down against said display panel until said graphics stick thereto; and, (g) lifting said frame to pull said film free of said graphics.

2. A method of transferring weeded graphics to a display panel by using an open frame having a plane-defining face and a film-mounting face spaced from and being substantially parallel to said plane-defining face and substantially covered on said film-mounting face with a sheet of transparent, flexible film having releasable adhesive on the side thereof toward said plane-defining face, said frame defining an open area large enough to encompass said graphics and said film being flexible enough to be pressed through said film substantially into alignment with a plane defined by said plane-defining surface, said method comprising:

(a) placing said weeded graphics onto said film from the plane-defining side of said frame to adhere the non-sticky side of said graphics to said film;

(b) peeling said release paper from said graphics, leaving the graphics adhered to said film;

(c) positioning said frame over said display panel and visually properly aligning said graphics with respect to said panel by observing said graphics and panel through said film;

(d) pressing said film, carrying said graphics on the underside thereof, down against said display panel until said graphics stick thereto; and, (e) lifting said frame to pull said film free of said graphics.

* * * * *